July 26, 1966
T. J. WEIR
3,262,528
VARIABLE FLUID TORQUE COUPLING
Filed March 18, 1964
4 Sheets-Sheet 1
Fig. 1.
Fig. 5.
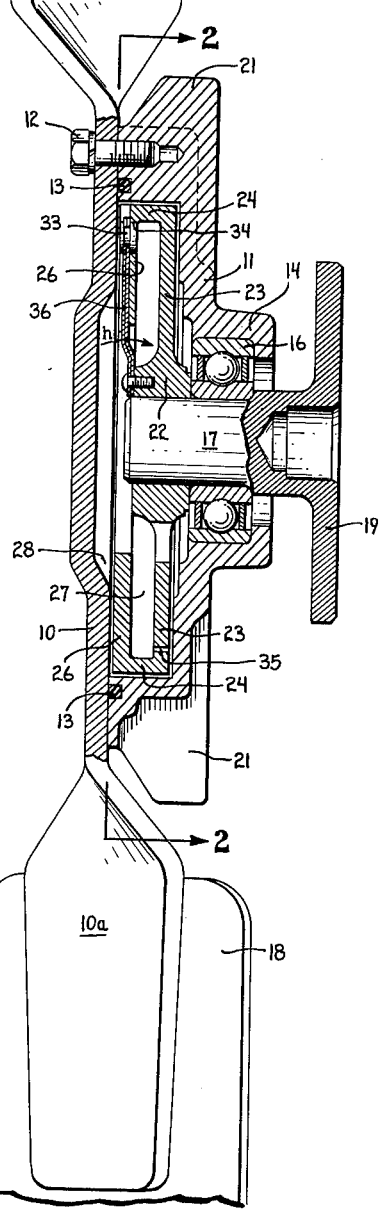
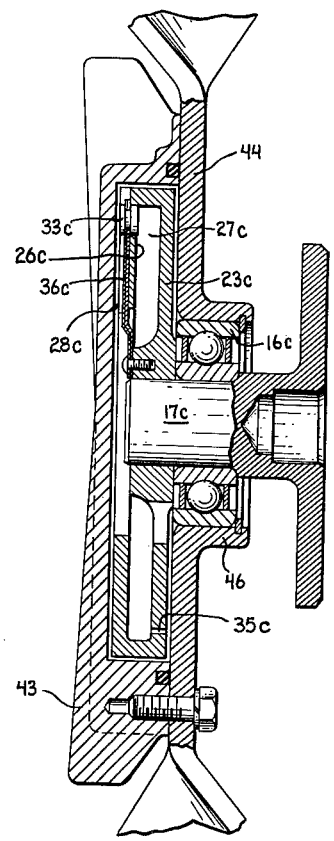
INVENTOR.
THOMAS J. WEIR
BY
Lockwood, Woodard, Smith & Weikart
Attorneys July 26, 1966

T. J. WEIR 3,262,528

VARIABLE FLUID TORQUE COUPLING

Filed March 19, 1964

INVENTOR.
THOMAS J. WEIR
BY
*Lockwood, Woodard, Smith & Weikart*
Attorneys

July 26, 1966
T. J. WEIR
3,262,528
VARIABLE FLUID TORQUE COUPLING
Filed March 13, 1964
4 Sheets-Sheet 3
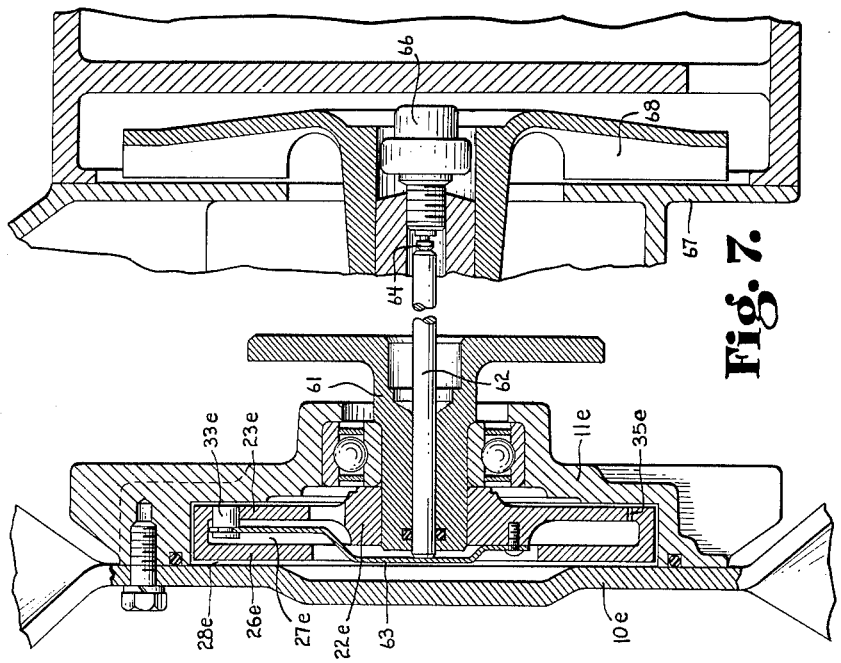
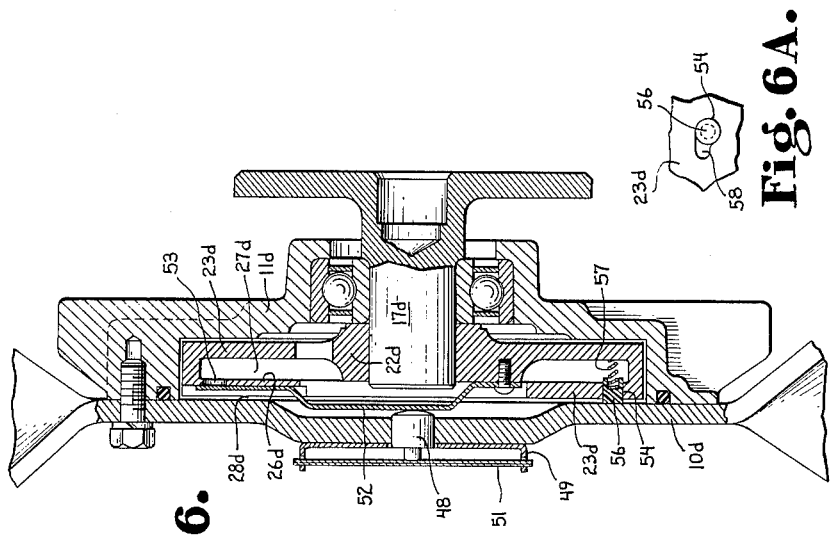
INVENTOR.
THOMAS J. WEIR
BY
Lockwood, Woodard, Smith & Weikart
Attorneys July 26, 1966  T. J. WEIR  3,262,528
VARIABLE FLUID TORQUE COUPLING
Filed March 13, 1964  4 Sheets-Sheet 4

INVENTOR.
THOMAS J. WEIR
BY
Lockwood, Woodard, Smith & Weikart
Attorneys

United States Patent Office 3,262,528
Patented July 26, 1966

3,262,528
VARIABLE FLUID TORQUE COUPLING
Thomas J. Weir, Indianapolis, Ind., assignor to Schwitzer Corporation, Indianapolis, Ind., a corporation of Indiana
Filed Mar. 18, 1964, Ser. No. 352,845
2 Claims. (Cl. 192—58)

This invention relates generally to fluid coupling devices and more particularly to a fluid coupling of the "dump and fill" type adapted to drive an accessory device, such as a cooling fan, for an internal combustion engine, the coupling being responsive to such parameters as temperature, input speed or the like.

In several of my copending patent applications such as Serial No. 249,704, filed January 7, 1963 now Patent No. 3,191,733 titled, Torque Transmitting Fluid Coupling; Serial No. 312,054, filed September 27, 1963, titled, Controlled Torque Transmitting Fluid Coupling; and Serial No. 188,743, filed April 19, 1962, now Patent No. 3,155,-209, titled, Fluid Coupling Device, there is disclosed and claimed various forms of coupling devices characterized by having a drive chamber and a storage chamber with the coupling fluid being transferred between the two chambers in response to conditions such as fluid temperature, input speed, etc. Such couplings are referred to as "dump and fill" couplings and have, heretofore, included a housing divided by an internal partition into a storage chamber and a drive chamber, with a drive disc or rotor disposed within the drive chamber.

The inventive concept of the present invention relates to certain structural improvements over those of my copending applications which result in a reduction cost brought about by the elimination of the partition member within the housing and improved heat dissipation from the coupling.

The primary object of the present invention is to provide a condition responsive fluid coupling device in which the fluid storage chamber is formed within the rotor or drive member itself thereby eliminating the necessity for a separate partition member to divide the housing into a storage and a drive chamber.

A further object of the present invention is to provide a condition responsive fluid coupling device having a minimum of parts and improved heat dissipating characteristics.

These and other objects will become apparent as the description proceeds with reference to the accompanying drawings in which:

FIG. 1 is a side sectional view of a coupling embodying the present invention adapted for operating an engine cooling fan.

FIG. 5 is a side sectional view of a coupling structure similar to FIG. 1 but modified in that the bearing support for the drive shaft is disposed in the fan spider.

FIG. 6 is a side sectional view showing a modified form of the structure with respect to the condition sensing means and the means for transferring fluid between the storage chamber and the drive chamber.

FIG. 6A is a fragmentary view showing the pumping means illustrated in FIG. 6.

FIG. 7 is a side sectional view similar to FIG. 1 but showing the fluid transfer means of the coupling operated in response to the temperature of the engine cooling fluid.

Figure 2:
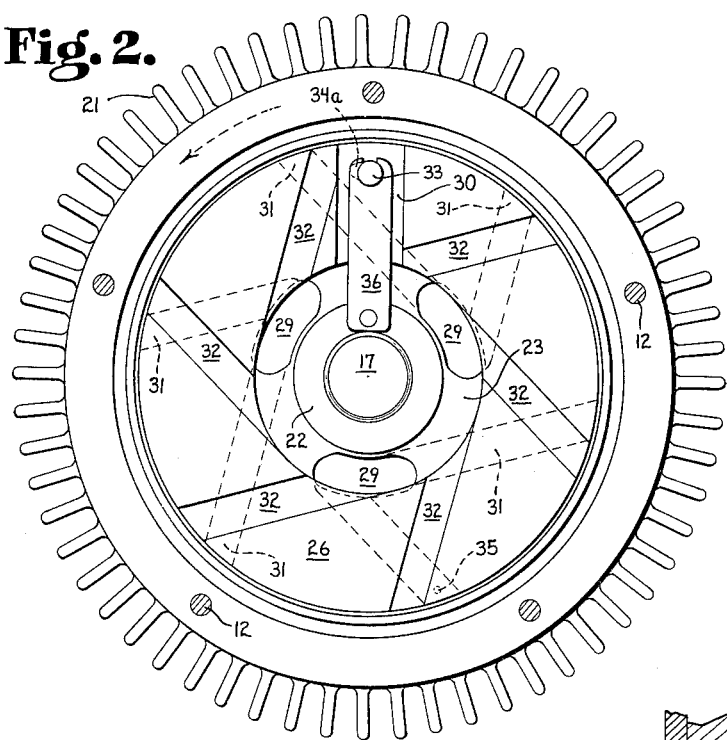
FIG. 2 is a sectional view taken generally along the line 2—2 of FIG. 1.

Referring initially to FIGS. 1 and 2, the invention is embodied in a fluid coupling unit which includes a casing or housing composed of an end plate 10 and a body casting 11, the body 11 having a circular cavity therein accommodating the drive disc or rotor to be subsequently described. The plate and body are secured together by screws 12, the junctions being sealed by the seal ring 13. The casting 11 is centrally apertured and the portion bounding the aperture is flanged outwardly as indicated at 14 to provide a hub. The hub accommodates an antifriction bearing assembly 16, the bearing being fitted on a drive shaft 17. The end plate 10 carries integral arms 10a which extend radially outward from the plate and are adapted to carry fan blades 18 rigidly secured to the arms.

The drive shaft 17 may be provided with a coupling flange 19 for coupling the drive shaft to any conventional rotating part of an internal combustion engine. The conventional arrangement for a fan drive coupling would connect the flange 19 to the pulley which drives the engine water pump.

The casting 11 carries radially outwardly extending vanes 21 which aid in the dissipation of heat from the assembly. Rigidly secured to the drive shaft 17 for rotation therewith, and positioned within the cavity formed by the casting 11 and the end plate 10, is a drive disc or rotor having a hub portion 22, and a body portion 23 extending radially outwardly from the hub. The peripheral area of the body portion 23 is folded upon itself to provide an intermediate portion 24 parallel to the adjacent sides of the cavity in the casting 11 and a radially inwardly projecting flange portion 26 spaced from the body portion 23 of the rotor. The formation of the rotor thus defines an annular fluid storage chamber or reservoir 27, the space within the closed cavity provided by casting 11 and plate 10 exterior of the rotor defining a drive chamber 28.

The body portion 23 of the rotor has spaced apertures 29 therein (FIG. 2) and the outer face of the portion 23 may be provided with grooves or channels 31 which extend chordally across the rotor face. Similarly, the outer face of the flange portion 26 of the rotor may be provided with chordally extending grooves 32 (FIG. 2), which extend from the periphery of the rotor to the margin of the flange portion 26. A small, calibrated aperture or orifice 35 extends through the portion 23 of the rotor. The inclination of the grooves 31 and 32 is such that with the drive rotor rotating counter-clockwise as viewed in FIG. 2 (and as indicated by the broken line arrow in FIG. 2), fluid will move under centrifugal force outwardly through aperture 35, then outwardly through the groove 31 intersected by the aperture, across the periphery 24 of the drive rotor, radially inwardly through the grooves 32 into storage chamber 27 and through aperture 35 back to the grooves 31. Aperture 35 is large enough to permit a cooling circulation of fluid but not so large as to destroy control of the amount of fluid in the drive chamber 28 by the control means to be subsequently described. The toroidal, cooling circulation of fluid thus provided is described in detail in my U.S. Letters Patent No. 2,879,755, granted March 31, 1959.

A means for controlling the flow of fluid between the reservoir or storage chamber 27 within the drive rotor and the drive chamber 28 exterior of the drive rotor may take the form of abutment member 33. The abutment member 33 may, for example, be of cylindrical configuration and extend into, but be movable within, an aperture 34 in the flange portion 26 of the drive rotor near its periphery. As will be evident from FIG. 2, the aperture 34 includes an extension forming a port 34a which provides fluid communication between the storage chamber 27 within the rotor and the drive chamber 28 exterior of the rotor. It will be noted that the abutment member 33 is positioned closely adjacent the port 34a but trails the port in the direction of rotation of the casing.

The control means further includes an arrangement for controlling the position of the abutment 33, the arrangement including a bimetal blade 36 within a radial groove 30 (FIG. 2) in the flange portion 26. The blade 36 is rigidly secured at one end to the hub portion 22 of the drive rotor and its opposite, bifurcated end accommodates the grooved central portion of the abutment 33. The low expansion side of the bimetal blade 36 is located adjacent the face of the rotor flange portion 26 so that upon an increase in temperature the free end, and hence the abutment 33, moves rightwardly as viewed in FIG. 1, the abutment and blade being shown in FIG. 1 in the maximum high-temperature position.

In operation, the storage chamber 27 and the drive chamber 28 are filled with a fluid, for example, such as a silicone oil, to a degree sufficient to place the equalized fluid level in the storage chamber and the drive chamber at a point intermediate the width of the flange portion 26 of the rotor. With the casing rotating, centrifugal force will distribute the fluid to a uniform level within the storage chamber or reservoir 27 and the drive chamber 28, the fluid passing freely through the port 34a. It will be understood that the rotational speed of the casing as compared to the rotational speed of the shaft 17, that is, the degree of coupling between the two, is dependent upon the amount of fluid in the drive chamber 28.

With the bimetal blade in its maximum temperature position shown in FIG. 1, the left hand end (as viewed in FIG. 1) of the abutment 33 will not extend beyond the outer (leftward) surface of the flange portion 26 of the drive rotor. As the temperature ambient to the bimetal blade 36 decreases, the abutment 33 will be moved leftwardly so that it protrudes from the outer (leftward) face of the flange portion 26 into the drive chamber 28. With the abutment member 33 in a position such that it extends into the drive chamber, the abutment will act as an impact type pump and will raise the fluid pressure in an area just ahead of, or leading, the abutment. The consequent increase in pressure in this area will drive or pump fluid from the drive chamber 28 through the port 34a into the reservoir or storage chamber 27 within the drive rotor.

Should the temperature ambient to the bimetal blade 36 increase, indicating that an increased degree of coupling between the drive shaft 17 and the casing is desirable, the bimetal blade will warp rightwardly as indicated in FIG. 1, thereby moving the abutment 33 rightwardly to its solid line position of FIG. 1. This motion of the abutment positions it so that it does not extend beyond the outer face of the flange portion 26 of the drive rotor and does not extend into the path of the fluid in the drive chamber 28. The pumping means formed by the abutment 33 is thus in an inactive position and centrifugal force maintains the fluid level uniform within the drive chamber 28 and the storage chamber 27, the drive chamber 28 under these conditions having maximum fluid therein. The degree of coupling between the drive shaft and the casing is thus increased with relation to the degree of coupling present when the abutment 33 is extended into the drive chamber 28. It will be understood that by reversing the direction of movement of the bimetal blade 36 in response to temperature change the abutment 33 might be utilized to pump fluid from the storage chamber 27 into the drive chamber 28 upon a decrease in temperature and this and similar alterations are intended to be within the scope of the present invention.

Figure 3:
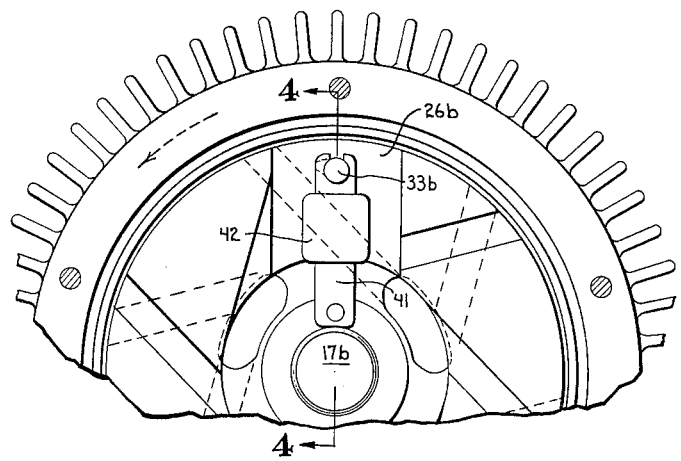
FIG. 3 is a fragmentary view, similar to FIG. 2, but showing a form of the device in which the control of transfer of fluid between the storage chamber or reservoir and the drive chamber is a function of input speed.
Figure 4:
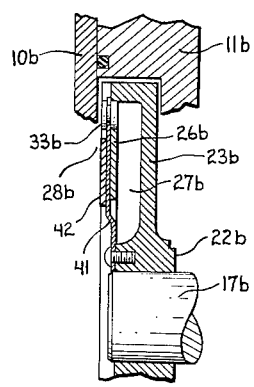
FIG. 4 is a fragmentary view taken generally along the line 4—4 of FIG. 3.

Referring now to FIGS. 3 and 4, a modified form of the structure will be described. The structure shown in FIGS. 3 and 4 is identical to that described with reference to FIGS. 1 and 2 except that the means for controlling the transfer of fluid between the storage chamber and the drive chamber is responsive to coupling input speed, that is, the speed of the drive shaft. Parts having identical counterparts in FIGS. 1 and 2 are given the same reference numerals but with the suffix "b." In this form a resilient blade 41 is utilized, the blade having one of its ends fastened rigidly to the hub portion 22b of the drive rotor and its other end carrying the abutment 33b. Intermediate its ends, the blade 41 has attached thereto a weight 42 having appreciable mass.

As shown in FIG. 4, the blade, and consequently the abutment 33b, are in the position assumed when the drive rotor is rotating at a speed sufficient for centrifugal force to cause the blade to move against the outer face of the flange portion 26b of the drive rotor and to withdraw the abutment 33b from the drive chamber 28b. As long as rotation continues at a speed sufficient to hold the blade 41 and the abutment 33b in this position, the fluid level will be at a maximum in the drive chamber 28b and substantially equalized with the storage chamber 27b. The degree of coupling between the drive shaft 17b and the housing will then be at a maximum. Should the input speed, that is, the speed of rotation of the drive rotor decrease to a point such that the resilient blade 41 is able to move the abutment 33b leftwardly so that it protrudes into the drive chamber 28b, fluid will then be pumped through the port adjacent the abutment 33b reducing the fluid level in the drive chamber 28b and increasing it in the storage chamber 27b. This decreases the degree of coupling between the drive shaft 17b and the casing. It will be understood that the shape of the resilient blade and the mounting of the weight 42 thereon might be altered from that shown (by placing the weight on the opposite side of the blade fulcrum point, for example) so that as the speed of the drive rotor increased the degree of coupling would be decreased and such alteration is considered to be within the scope of the present invention.

Referring now to FIG. 5, a further modified form of a structure embodying the present invention will now be described. The structure of FIG. 5 is identical to that of FIG. 1 except that the bearing support for the housing is incorporated into the end plate or fan spider rather than in the body casting as in the structure of FIG. 1. Parts which are identical to those referred to with reference to FIG. 1 are given the same reference numerals as in FIG. 1 but with the suffix "c." In the structure of FIG. 5, the body casting 43 extends unbroken across the front face of the coupling and the fan spider or plate 44 is flanged outwardly as indicated at 46 to accommodate the antifriction bearing 16c fitted on the drive shaft 17c. A bimetal blade 36c carries the abutment 33c which controls the transfer of fluid between the storage chamber 27c within the drive rotor and the drive chamber 28c. The operation of the device is identical to that of FIG. 1.

Referring now to FIGS. 6 and 6a, there is shown a modified form of the structure embodying the present invention which differs from the structures previously described in that the pumping means is operated in response to temperature changes externally of the coupling device and a somewhat different form of pumping means for transferring fluid between the storage chamber and the drive chamber is utilized. Certain of the component parts of the structure of FIG. 6 are identical to those described with reference to FIG. 1 and these are given the same reference numerals as in FIG. 1 but with the suffix "d." In this structure the plate 10d has a central aperture therein freely accommodating the thrust pin 48. Supported on the exterior face of the plate 10d is a bracket 49, U-shaped in cross-section. A bimetal blade 51 has reduced end tabs which extend into apertures in the upstanding legs of the bracket 49, the central portion of the bimetal member 51 bearing against the reduced end of the thrust pin 48. The bimetal 51 has its high expansion side remote from the plate 10d so that the central portion of the bimetal plate 51 moves leftwardly, as viewed in FIG. 6, upon an increase in temperature ambient to the bimetal.

The inner end of the thrust pin 48 bears against a resilient blade 52 having one end rigidly attached to the hub portion 22d of the drive rotor and having its free end overlying an aperture 53 in the flange portion 26d of the drive rotor. The aperture 53 is situated substantially identically to the aperture 34 of FIG. 1.

At a point on the flange portion 23d of the drive rotor which may be diametrically opposite the aperture 53, the drive rotor flange portion is provided with a second aperture 54 within which is slidable an abutment member 56. A compression spring 57 urges the abutment member 56 outwardly into the drive chamber 28d. As may best be seen in FIG. 6a the aperture 54 accommodating the abutment 56 is extended to provide the fluid transfer port 58.

In operation, it will be obvious that the abutment 56 extends continuously within the drive chamber 28d and that, as the drive rotor rotates, fluid will be continuously pumped from the drive chamber 28d through the port 58 and into the storage chamber 27d within the rotor. With the free end of the blade 52 closing the aperture 53, fluid will be removed from the drive chamber and accumulate in the storage chamber until the fluid level in the drive chamber is reduced to a position corresponding with the position of the fluid transfer port 58. Should the temperature ambient to the bimetal 51 increase, the central portion of the bimetal element will move leftwardly as viewed in FIG. 6. This permits the thrust pin 48 to move leftwardly under the restoring force exerted by the resilient blade 52 and permits the free end of the blade 52 to open or unmask the aperture 53. With aperture 53 open fluid may drain, under the pressure of centrifugal force, from the storage chamber 27d, through the aperture 53 and back into the drive chamber 28d. Under such conditions, the consequent increase in fluid level in the drive chamber 28d will increase the degree of coupling between the drive rotor and the casing. Upon a decrease in temperature ambient to the bimetal element 51, the reverse action will occur and the aperture 53 will be closed by the free end of the blade 52 as shown in FIG. 6. Fluid will then accumulate in the storage chamber 27d and the degree of coupling between the driving rotor and the casing will be reduced. It will be obvious that by reversing the orientation of the bimetal blade 51, the amount of fluid in the drive chamber 28d could be decreased, thus decreasing the degree of coupling, upon an increase in temperature ambient to the bimetal member and such modifications of the structure are considered to be within the scope of the present invention.

Referring now to FIG. 7, there is disclosed a structure embodying the present invention which is similar to that previously described with reference to FIG. 1 except that the transfer of fluid between the storage chamber and the drive chamber is in response to the temperature of the water or other cooling fluid used for an internal combustion engine, and, further, the pumping means is positioned within the storage chamber communicating with the drive chamber through a port in the drive rotor wall, and is located on the body portion of the drive rotor rather than upon the flange portion. In the structure of FIG. 7, the end plate or fan spider 10e is secured to the body casting 11e, the casting and the drive shaft 61 having an antifriction bearing therebetween. The drive rotor has a hub portion 22e, a body portion 23e and a flange portion 26e. The casing and the drive rotor define a drive chamber 28e and, interiorly of the drive rotor, a storage chamber 27e. The drive shaft 61 has a central bore therein accommodating a thrust pin 62. The left-hand end of the thrust pin engages a resilient blade 63 which is rigidly attached, at one of its ends, to the hub portion 22e of the drive discs. The free end of the blade 63 carries the abutment 33e which is the counterpart of the abutment 33 of the structure of FIG. 1 and which, when extended into the drive chamber provides the pumping action for transferring fluid through its adjacent fluid transfer port (not shown) as described with reference to FIG. 1.

The right-hand end (as viewed in FIG. 7) of the thrust pin 62 is contacted by the movable element 64 of a conventional temperature responsive member 66.

The temperature sensing element 66 is positioned in the cooling fluid moved through the water jacket 67 by the conventional pump member 68 of an internal combustion engine (not shown).

In operation, and with the parts in their position shown in FIG. 7, the movable member 64 of the temperature responsive element 66 is in extended or high temperature position and the abutment 33e is consequently in its effective, extreme left-hand position. In this position, the abutment 33e does not extend into the drive chamber 28e and fluid is not pumped from the drive chamber into the storage chamber 27e. Under these conditions the amount of fluid in the drive chamber 28e is at a maximum as is the degree of coupling between the driving rotor and the casing. Should the temperature of the fluid adjacent the temperature responsive element 66 decrease, the thrust pin 62 will be moved rightwardly, as viewed in FIG. 7, causing the abutment 33e to shift rightwardly and to extend into the drive chamber 28e. When the abutment 33e extends into the drive chamber the pumping action, previously described, will occur and fluid will be driven from the drive chamber 28e through the port adjacent the abutment 33e and into the storage chamber 27e within the drive rotor. Under these conditions, the fluid within the drive chamber will be reduced as will, correspondingly, the degree of coupling between the drive rotor and the casing. It will be obvious that by placing the abutment 33e in an aperture in the flange portion 26e of the drive rotor, similar to the arrangement of FIG. 1, the pumping action could be made to occur upon an increase in temperature thus reversing the controlling action of the fluid temperature with relation to the degree of coupling from that shown. Such modifications of the structure of FIG. 1 are considered to be within the scope of the present invention.

Figure 8:
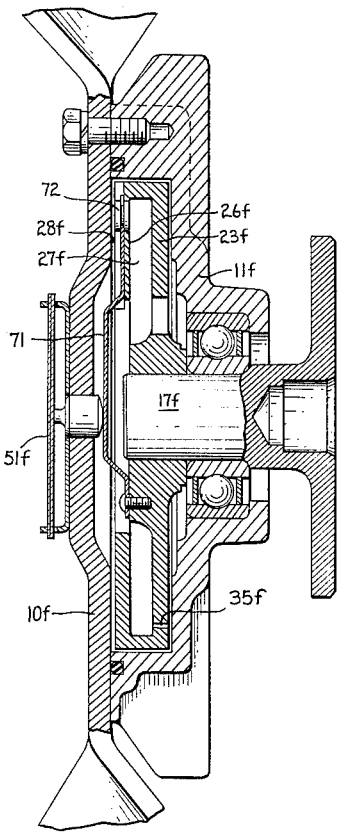
FIG. 8 is a side sectional view similar to FIG. 1 but illustrating the fluid transfer means of the coupling as operated in response to the ambient air temperature external to the coupling.

Referring now to FIG. 8, a modified form of the structure embodying the present invention will be described, this form of the structure being in all respects identical to that described with reference to FIG. 6 except that it utilizes the intermittently actuated pumping means previously described with reference to FIG. 1 rather than the continuously actuated pumping means of FIG. 6. Components having identical counterparts in FIG. 6 are given the same reference numerals as in FIG. 6 but with the suffix "f." The structure of FIG. 8 includes a resilient blade 71, similar to the blade 52 of FIG. 6, but carrying the abutment 72 at its free end. The abutment 72 moves within an aperture in the flange portion 26f of the driving rotor and serves, when positioned so as to extend into the drive chamber 28f, to pump fluid from the drive chamber into the storage chamber 27f through a port adjacent the abutment 72. The port referred to is not shown in FIG. 8 but is in all respects identical to the port 34a shown in FIG. 2.

The bimetal element 51f may have its high expansion side remote from the outer face of the plate 10f so that the central portion of the bimetal moves leftwardly, as viewed in FIG. 8, when the temperature ambient to the bimetal increases.

In operation, and with the parts in the position shown in FIG. 8, there will be no pump induced transfer of fluid between the storage chamber and the drive chamber and the amount of fluid will be at a maximum within the drive chamber. The degree of coupling, under these conditions, will also be at a maximum. Should the temperature ambient to the bimetal 51f increase, the blade 71 will be permitted to move leftwardly, as viewed in FIG. 8, and will correspondingly move the abutment 72 so that it extends into the drive chamber 28f. Under these conditions, fluid will be pumped from the drive chamber into the storage chamber as previously described and the volume of fluid within the drive chamber will be reduced to reduce the degree of coupling between the driving rotor and the casing. It will be obvious that the degree of coupling could be made a direct function of the temperature change merely by, for example, reversing the high expansion and low expansion sides of the bimetal 51f and such modifications of the structure are considered to be within the scope of the present invention.

Figure 9:
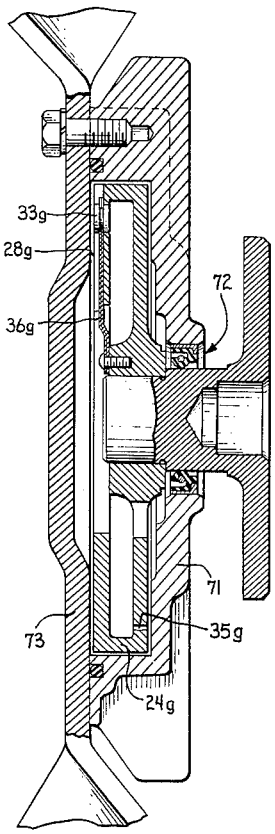
FIG. 9 is a side sectional view illustrating a further modified form of the device in which the drive disc or rotor finds its bearing support at the outside diameter of the rotor.

Referring to FIG. 9, a further modified form of the structure is disclosed. The structure is identical to that shown in FIG. 1 except that the peripheral portion of the drive rotor acts as a bearing support for the casing. In this form of the structure the body casting 71 accommodates a dynamic fluid seal assembly indicated generally at 72 rather than an antifriction bearing. The casing made up of the casting 71 and the plate or fan spider 73 find their bearing support on the fluid film existing between the outer surface of the peripheral portion 24g of the drive rotor. The bimetal element 36g is identical to the bimetal element 36 of FIG. 1 and in identical fashion operates the abutment 33g to provide the temperature responsive pumping action which controls the volume of fluid in the drive chamber 28g and hence the degree of coupling between the driving rotor and the casing.

It will be evident from the foregoing that all of the various modified forms of the device provide the required storage and drive chamber without the use of an intermediate partition plate within the housing. The absence of such a dividing partition permits all of the drive chamber, in contrast to merely a portion of it, to be in direct contact with the outer, heat-dissipating walls of the coupling housing, and the transfer of heat from the fluid to the housing is thereby facilitated.

While the invention has been disclosed and described in some detail in the drawings and foregoing description, they are to be considered as illustrative, and not restrictive in character, as other modifications may readily suggest themselves to persons skilled in this art and within the broad scope of the invention, reference being had to the appended claims.

The invention claimed is:
1. A fluid coupling device comprising a drive shaft, driven means comprising an outer casing rotatably mounted on said shaft, and defining a drive chamber therein, a drive disc mounted on said shaft within said outer casing, said drive disc having a central hub portion locked to said shaft and a body portion extending radially outwardly from the hub portion, the peripheral area of said body portion being folded upon itself to provide a radially inwardly projecting flange portion spaced from said body portion thereby defining an annular fluid storage chamber within said drive disc, the outer surfaces of said flange and body portions being disposed in close face-to-face relation with interior surfaces of said casing, said flange portion of said rotor having a fluid transfer aperture therein adjacent the periphery of said rotor, fluid within said drive chamber and said storage chamber, and condition responsive means supported on said rotor for controlling the flow of fluid through said fluid transfer aperture and hence the distribution of fluid between said drive and storage chambers to thereby control the degree of coupling between said drive shaft and driven means.

2. A fluid coupling device comprising a drive shaft, driven means comprising an outer casing rotatably mounted on said shaft and defining a drive chamber therein, a drive disc mounted on said shaft within said outer casing, said drive disc having a central hub portion locked to said shaft, a body portion extending radially outwardly from the hub portion and a radially inwardly projecting flange portion spaced from said body portion thereby defining an annular fluid storage chamber within said drive disc, the outer surfaces of said flange and body portions being disposed in close face-to-face relation with interior surfaces of said casing, said flange portion of said rotor having a fluid transfer aperture therein adjacent the periphery of said rotor, fluid within said drive chamber and said storage chamber, and condition responsive means for controlling the flow of fluid through said fluid transfer aperture and hence the distribution of fluid between said drive and storage chambers to thereby control the degree of coupling between said drive shaft and driven means.

References Cited by the Examiner

UNITED STATES PATENTS

| | | | |
|---|---|---|---|
| 2,792,095 | 5/1957 | Sherman | 192—58 |
| 2,877,751 | 3/1959 | Johnston. | |
| 2,879,755 | 3/1959 | Weir. | |

DAVID J. WILLIAMOWSKY, *Primary Examiner.*

DON A. WAITE, *Examiner.*

A. T. McKEON, *Assistant Examiner.*